US007159581B2

(12) United States Patent
Pagot

(10) Patent No.: US 7,159,581 B2
(45) Date of Patent: Jan. 9, 2007

(54) METHOD OF CONTROLLING RECIRCULATION OF THE EXHAUST GAS OF AN INTERNAL-COMBUSTION SUPERCHARGED ENGINE AND ENGINE USING SUCH A METHOD

(75) Inventor: Alexandre Pagot, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/082,787

(22) Filed: Mar. 18, 2005

(65) Prior Publication Data

US 2005/0217648 A1    Oct. 6, 2005

(30) Foreign Application Priority Data

Mar. 31, 2004   (FR) .................................. 04 03414

(51) Int. Cl.
*F02B 47/08* (2006.01)
*F02B 47/10* (2006.01)
(52) U.S. Cl. .............................. 123/568.14; 123/568.13
(58) Field of Classification Search ........... 123/568.14, 123/568.15, 568.11, 568.13, 90.15; 60/605.2
See application file for complete search history.

(56) References Cited

U.S. PATENT DOCUMENTS

| 3,982,395 | A | | 9/1976 | Hasegawa et al. | |
|---|---|---|---|---|---|
| 5,133,310 | A | * | 7/1992 | Hitomi et al. | ........... 123/90.15 |
| 5,357,936 | A | * | 10/1994 | Hitomi et al. | ............. 60/605.2 |
| 5,782,226 | A | * | 7/1998 | Gartner | .................. 123/568.13 |
| 6,170,474 | B1 | * | 1/2001 | Israel | ..................... 123/568.14 |
| 6,178,933 | B1 | | 1/2001 | Lavy | |
| 6,397,802 | B1 | * | 6/2002 | Rutschmann et al. | ..... 123/90.15 |
| 6,626,164 | B1 | * | 9/2003 | Hitomi et al. | ............... 123/679 |
| 6,918,363 | B1 | * | 7/2005 | Daigo et al. | ............. 123/90.16 |
| 2003/0164163 | A1 | | 9/2003 | Lei et al. | |

FOREIGN PATENT DOCUMENTS

| EP | 1 294 821 | 11/1972 |
|---|---|---|
| JP | 2000-199400 | 7/2000 |
| WO | WO 2004/025109 A1 | 3/2004 |

* cited by examiner

*Primary Examiner*—Mahmoud Gimie
(74) *Attorney, Agent, or Firm*—Antonelli, Terry, Stout and Kraus, LLP.

(57) ABSTRACT

The present invention relates to a method of controlling recirculation of part of the exhaust gas of an internal-combustion supercharged engine with a combustion cycle during which at least one cylinder (10) of the engine is in the intake phase simultaneously with at least one other cylinder (14) in the exhaust phase, the cylinders comprising at least one intake means (18) with an intake valve (20) and at least one exhaust means (24) with an exhaust valve (26), said engine further comprising an exhaust manifold (32) connecting said exhaust means.

According to the invention, the method consists, when the engine works with a lean fuel mixture, in controlling opening of the exhaust valve (26) of cylinder (10) in the intake phase so as to introduce part of the exhaust gas coming from cylinder (14) in the exhaust phase and contained in manifold (32).

9 Claims, 1 Drawing Sheet

METHOD OF CONTROLLING RECIRCULATION OF THE EXHAUST GAS OF AN INTERNAL-COMBUSTION SUPERCHARGED ENGINE AND ENGINE USING SUCH A METHOD

FIELD OF THE INVENTION

The present invention relates to a method of controlling recirculation of the exhaust gas of an internal-combustion supercharged engine and to an engine using such a method.

It more particularly relates to engines that can work with such a recirculation in order to improve the reduction of emissions and more particularly of nitrogen oxides (NOx) when these engines work with a lean fuel mixture.

BACKGROUND OF THE INVENTION

The use of recirculation of part of the exhaust gas to the intake of the engine in order to reduce NOx emissions has become a common procedure, as illustrated by way of example in patent U.S. Pat. No. 3,982,395, and it is generally necessary for engines working at low or medium load with a lean fuel mixture. In fact, introducing exhaust gases into the cylinders in the intake phase has the effect of decreasing the amount of fresh air that can mix with the fuel. This allows to lower the combustion temperature of the fuel mixture and consequently to reduce the production of NOx resulting from this combustion.

Generally, this recirculation is achieved by means of a circuit referred to as EGR (Exhaust Gas Recirculation) circuit, comprising a line connecting the exhaust manifold of the engine to its intake manifold and a valve, referred to as EGR valve, placed in this line and allowing to control the flow of gas circulating therein.

This circuit has the drawback of being very complex as regards installation of the line and of the valve, of leading to quite significant additional costs and of requiring very sophisticated EGR valve control means.

Even greater disadvantages add further to those described above in the configuration where supercharging of the engine is to be improved.

In fact, when the rotating speed of the turbine has to be rapidly increased, it is often accepted that, in the cylinders, a fuel mixture is achieved in stratified form and under lean-burn conditions so as to increase the amount of exhaust gas resulting from the combustion. Such a mixture leads to a combustion that produces a large amount of NOx and it is desirable to minimize this NOx production by exhaust gas recirculation. Furthermore, such a stratified fuel mixture also allows to significantly reduce the fuel consumption. However, during exhaust gas recirculation, pumping phenomena due to the pressure conditions required for this recirculation appear and these pumping losses greatly reduce the fuel consumption gains that could be expected from the stratified fuel mixture.

The present invention aims to overcome the aforementioned drawbacks by means of a method for controlling recirculation of exhaust gas allowing to do without a recirculation line and an EGR valve while using the necessary and sufficient amount of exhaust gas to allow the NOx emissions to be controlled. Furthermore, pumping losses are nearly eliminated and the fuel consumption reduction is increased.

SUMMARY OF THE INVENTION

The invention therefore relates to a method of controlling recirculation of part of the exhaust gas of an internal-combustion supercharged engine with a combustion cycle during which at least one cylinder of the engine is in the intake phase simultaneously with at least one other cylinder in the exhaust phase, the cylinders comprising at least one intake means with an intake valve and at least one exhaust means with an exhaust valve, said engine further comprising an exhaust manifold connecting said exhaust means, characterized in that it consists, when the engine works with a lean fuel mixture, in controlling opening of the exhaust valve of the cylinder in the intake phase so as to introduce part of the exhaust gas coming from the cylinder in the exhaust phase and contained in the manifold.

Advantageously, the method can consist in controlling opening of the exhaust valve of the cylinder in the intake phase substantially simultaneously with the opening of the exhaust valve of the cylinder in the exhaust phase.

This control method can also consist in controlling opening of the intake valve of the cylinder in the intake phase substantially simultaneously with the closing of its exhaust valve.

Alternatively, it can consist in controlling opening of the intake valve of the cylinder in the intake phase substantially simultaneously with the opening of its exhaust valve.

The invention also relates to an internal-combustion supercharged engine wherein the cylinders comprise at least one intake means with an intake valve, at least one exhaust means with an exhaust valve and a manifold connecting the exhaust means of said cylinders, characterized in that it comprises exhaust valve control means for controlling opening of the exhaust valve of at least one cylinder in the intake phase so that part of the exhaust gas coming from at least one cylinder in the exhaust phase and contained in said manifold is introduced into the cylinder in the intake phase.

The control means can comprise means for varying the exhaust valve lift laws.

The lift law variation means can include VVT or VVL type controls.

When the internal-combustion engine is a supercharged engine wherein a turbosupercharger provides intake air supercharging in the cylinder in the intake phase, the turbosupercharger comprises a single inlet.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
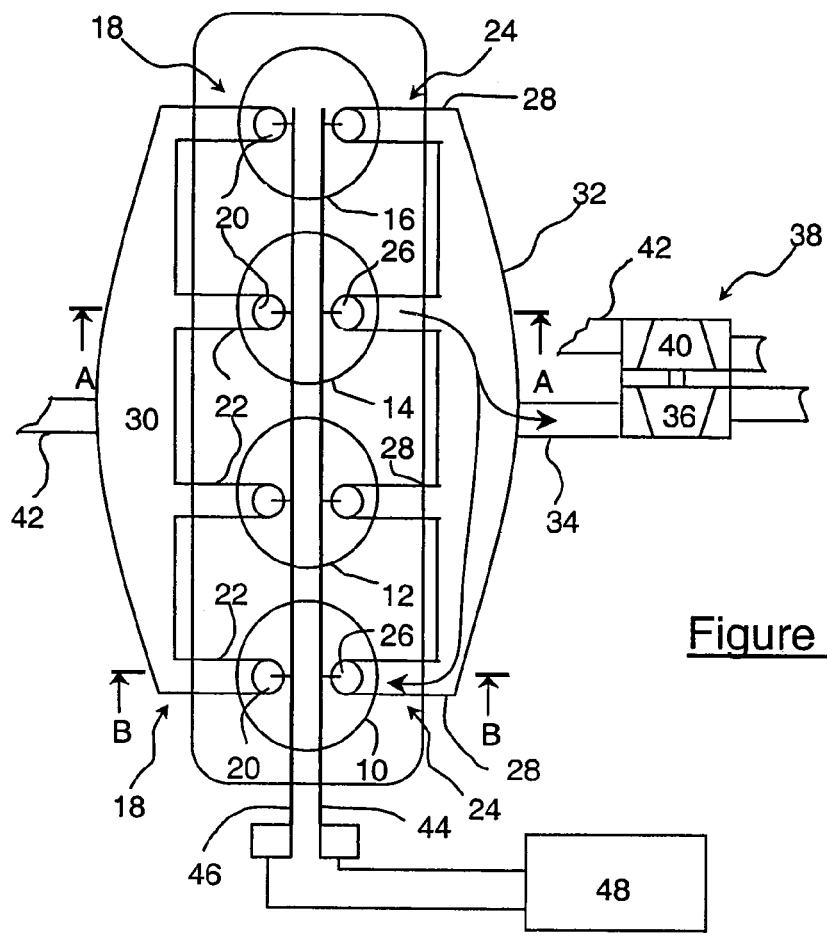
FIG. 1 shows a four-cylinder supercharged engine according to the invention.

In FIG. 1, an internal-combustion supercharged engine, notably of direct fuel injection type, comprises at least four cylinders 10, 12, 14, 16 or a multiple of four cylinders. Each cylinder comprises at least one intake means 18 with an intake valve 20 and an intake pipe 22 and at least one exhaust means 24 with an exhaust valve 26 and an exhaust pipe 28. An intake manifold 30 connects intake pipes 22 to one another while exhaust pipes 28 open onto an exhaust manifold 32. This exhaust manifold is connected by a line 34 to the single inlet of a turbine 36 of a turbosupercharger 38.

This turbine is connected by means of a shaft to a compression stage 40 of this turbosupercharger. The compression stage thus allows, as it is known in the art, to compress ambient air admitted therein and to distribute it, in the compressed state, in intake manifold 30 through a line 42.

Opening and closing of exhaust valves 26 is controlled by means 44 such as those known as VVT (Variable Valve Timing) or VVL (Variable Valve Lift), allowing to vary the lift laws of these valves, notably at the time of their opening and closing, independently of one another. Similarly, intake valves 20 can be controlled by means 46 which also allow to vary the lift laws of these valves, and VVT or VVL type control means are preferably used. Means 44 and 46 are driven by a control unit 48 allowing to change the valve lift laws according to the engine running conditions such as the engine speed or its load.

As it is known in the art, each cylinder comprises a piston 50 moving in a reciprocating translation motion between a lower position referred to as bottom dead center (BDC) and an upper position referred to as top dead center (TDC), and conversely, by means of a connecting rod 52 connected to a crankpin of a crankshaft (not shown) which such an engine is usually equipped with. This cylinder also comprises a combustion chamber 54 delimited by the top of the piston and the top of the cylinder. Intake means 18 and exhaust means 24 open into this chamber (FIGS. 2 and 3), as well as all fuel injection means (not shown) allowing to obtain a fuel mixture in chamber 54 and any ignition means for this mixture, such as spark ignition in the case of a spark-ignition engine, to perform combustion of this fuel mixture.

In the example described in connection with the present invention, it is considered that the engine works with a combustion cycle, at a determined crankshaft position, wherein simultaneously cylinder 10 is in the intake phase during which piston 50 travels from the neighbourhood of its TDC to the neighbourhood of its BDC, cylinder 12 is in the compression phase, cylinder 14 is in the exhaust phase with the piston travelling from the neighbourhood of its BDC to the neighbourhood of its TDC, and the last cylinder (cylinder 16) is in the expansion phase, this cycle being commonly referred to as 1, 4, 3, 2.

Figures 2, 3:
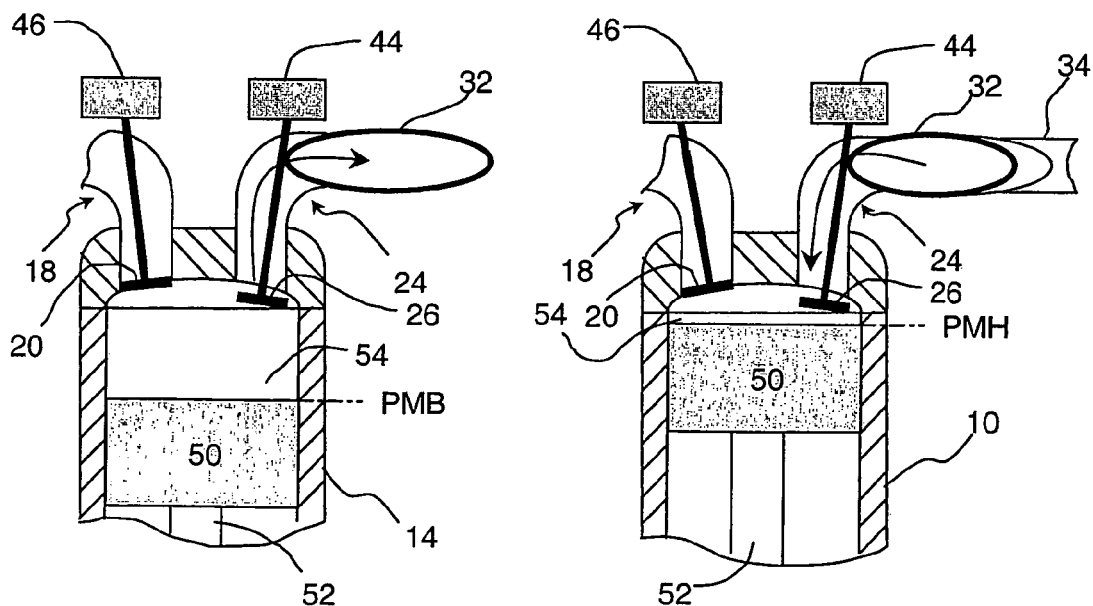
FIGS. 2 and 3 are partial sectional views respectively of a cylinder in the exhaust phase (cross-section along AA) and of another cylinder in the intake phase (cross-section along BB) of the engine of FIG. 1.

In FIGS. 2 and 3 showing the configurations of cylinders 14 and 10 at the same determined crankshaft position, cylinder 14 is in the exhaust phase with piston 50 in the neighbourhood of its bottom dead center (BDC) whereas cylinder 10 is in the intake phase with piston 50 in the neighbourhood of its top dead center (TDC). The pressure Pe prevailing in combustion chamber 54 of cylinder 14 corresponds to the pressure of the exhaust gas at the end of the expansion phase, which is of the order of 5 bars (0.5 MPa), and the pressure Padm in chamber 54 of cylinder 10 is far below this exhaust pressure.

Thus, in the case of an engine working at low or medium loads, and if a turbine speed increase is desired, the engine computer which is generally associated with this engine determines the fuel injection and air intake parameters required to obtain a lean mixture. This engine computer also sends instructions to control unit 48 to achieve recirculation of the exhaust gas in chamber 54 of cylinder 10 in the intake phase to minimize the NOx emissions.

Part of the exhaust gas from cylinder 14 in the exhaust phase is therefore used, via the exhaust manifold, to be injected into cylinder 10 in the intake phase. More precisely, the exhaust gas coming from chamber 54 through exhaust valve 26 is discharged into exhaust manifold 32, then part of this gas contained in the manifold is fed into chamber 54 of cylinder 10 in the intake phase by controlling opening of its exhaust valve 26. The other part of the gas is discharged to turbine 36 of turbosupercharger 38 via line 34.

To achieve such a recirculation, control unit 48 operates control means 44 so that they actuate exhaust valves 26 in such a way that opening of valve 26 of cylinder 14 is controlled to discharge the gas towards exhaust manifold 32 and opening of exhaust valve 26 of cylinder 10 is controlled, i.e. it is maintained in open position for a determined time, so that part of the exhaust gas present in exhaust manifold 32 is fed into chamber 54 of cylinder 10. Once this amount of exhaust gas is introduced, means 44 control closing of valve 26 of cylinder 10 and maintain valve 26 of cylinder 14 open until substantially the end of the exhaust phase, i.e. around the top dead center of piston 50 of cylinder 14.

After closing of valve 26 of cylinder 10, control means 46 actuate intake valve 20 of the cylinder in the intake phase so as to introduce supercharged air into chamber 54 of this cylinder.

Of course, without departing from the scope of the invention, it is possible to consider opening simultaneously the intake 20 and exhaust 26 valves of cylinder 10 in the intake phase to obtain a homogeneous mixture in the combustion chamber. This is possible because the pressure Padm prevailing in chamber 54 is lower than the pressure of the exhaust gas contained in the manifold, this pressure being slightly above the pressure Pe of the gas coming from cylinder 14.

If recirculation of the exhaust gas is not necessary and more particularly in case of a fuel mixture under stoichiometric conditions, means 44 and 46 actuate opening and closing of valves 20 and 26 in a conventional way or allow to achieve scavenging of the residual burnt gases, as described more in detail in French patent application No. 03-14,967 filed by the applicant.

By means of this layout, almost all of the exhaust gas, except for the amount required for recirculation, is used to drive the turbine. Furthermore, no particular layout is required for this recirculation, only the components commonly present in an engine are used.

The present invention is not limited to the embodiment example described and it includes all equivalents or variants.

Notably, the above description applies to indirect injection engines, supercharged or not, notably spark-ignition engines, as well as to direct injection engines, supercharged or not.

The invention claimed is:

1. A method of controlling recirculation of part of the exhaust gas of an internal-combustion supercharged engine with a combustion cycle during which at least one cylinder of the engine is in the intake phase simultaneously with at least one other cylinder in the exhaust phase, the cylinders comprising at least one intake means with an intake valve and at least one exhaust means with an exhaust valve, said engine further comprising an exhaust manifold connecting said exhaust means, characterized in that it comprises, when the engine works with a lean fuel mixture, controlling opening of the exhaust valve of the at least one cylinder in the intake phase substantially simultaneously with the opening of the exhaust valve of the at least one other cylinder in the exhaust phase so as to introduce part of the exhaust gas coming from the at least one other cylinder in the exhaust phase and contained in the manifold into the at least one cylinder in the intake phase.

2. A method as claimed in claim 1, characterized in that it comprises controlling opening of the intake valve of the at least one cylinder in the intake phase substantially simultaneously with the closing of its exhaust valve.

3. A method as claimed in claim 1, characterized in that it comprises controlling opening of the intake valve of the at least one cylinder in the intake phase substantially simultaneously with the opening of its exhaust valve.

4. An internal-combustion supercharged engine wherein cylinders comprise at least one intake means with an intake valve, at least one exhaust means with an exhaust valve and a manifold connecting the exhaust means of said cylinders, characterized in that it comprises means for controlling exhaust valves so as to control opening of the exhaust valve of at least one cylinder in the intake phase substantially simultaneously with the opening of the exhaust valve of the at least one other cylinder in the exhaust phase so that part of the exhaust gas coming from at least one other cylinder in the exhaust phase and contained in said manifold is introduced into the at least one cylinder in the intake phase.

5. An internal-combustion supercharged engine as claimed in claim 4, characterized in that the control means comprise means of varying the lift laws of the exhaust valves.

6. An internal-combustion supercharged engine as claimed in claim 5, characterized in that the lift law variation means comprise VVT or VVL type controls.

7. An internal-combustion engine as claimed in claim 4, further comprising a turbosupercharger for providing intake air supercharging in the at least one cylinder in the intake phase, characterized in that the turbosupercharger comprises a single inlet.

8. An internal-combustion engine as claimed in claim 5, further comprising a turbosupercharger for providing intake air supercharging in the at least one cylinder in the intake phase, characterized in that the turbosupercharger comprises a single inlet.

9. An internal-combustion engine as claimed in claim 5, further comprising a turbosupercharger for providing intake air supercharging in the at least one cylinder in the intake phase, characterized in that the turbosupercharger comprises a single inlet.

* * * * *